(12) United States Patent
Sauer et al.

(10) Patent No.: US 10,674,883 B2
(45) Date of Patent: *Jun. 9, 2020

(54) VACUUM CLEANER ROBOT

(71) Applicant: Eurofilters Holding N.V., Overpelt (BE)

(72) Inventors: Ralf Sauer, Overpelt (BE); Jan Schultink, Overpelt (BE)

(73) Assignee: EUROFILTERS HOLDING N.V., Overpelt (BE)

( * ) Notice: Subject to any disclaimer, the term of this patent is extended or adjusted under 35 U.S.C. 154(b) by 264 days.

This patent is subject to a terminal disclaimer.

(21) Appl. No.: 15/543,856

(22) PCT Filed: Dec. 11, 2015

(86) PCT No.: PCT/EP2015/079464
§ 371 (c)(1),
(2) Date: Jul. 14, 2017

(87) PCT Pub. No.: WO2016/116220
PCT Pub. Date: Jul. 28, 2016

(65) Prior Publication Data
US 2018/0008108 A1    Jan. 11, 2018

(30) Foreign Application Priority Data

Jan. 20, 2015    (EP) .................................... 15151742

(51) Int. Cl.
*A47L 9/00*    (2006.01)
*B60B 19/00*    (2006.01)
(Continued)

(52) U.S. Cl.
CPC .............. *A47L 9/009* (2013.01); *A47L 5/362* (2013.01); *A47L 9/02* (2013.01); *A47L 9/0477* (2013.01);
(Continued)

(58) Field of Classification Search
None
See application file for complete search history.

(56) References Cited

U.S. PATENT DOCUMENTS 2,036,056 A   3/1936   Kroenlein
2,101,390 A   12/1937  Gorissen
(Continued)

FOREIGN PATENT DOCUMENTS

CA    2 498 435 A1    8/2006
CN    1121797 A    5/1996
(Continued)

OTHER PUBLICATIONS

Best Vacuum Terminology Ref found at https://www.bestvacuum.com/vacuum-cleaner-specifications, attached as pdf (Year: 2019).*
(Continued)

*Primary Examiner* — Brian D Keller
(74) *Attorney, Agent, or Firm* — Brinks Gilson & Lione

(57) ABSTRACT

The invention relates to a vacuum cleaner robot comprising a dust collector arrangement mounted on wheels, a suction hose and a floor nozzle mounted on wheels, where the floor nozzle is fluidically connected to the dust collector arrangement via the suction hose, also comprising a motorized fan unit for suctioning an air stream in through the floor nozzle, where the motorized fan unit is arranged between the floor nozzle and the dust collector arrangement in such a manner that an air stream suctioned in through the floor nozzle flows through the motorized fan unit and into the dust collector arrangement. where the dust collector arrangement comprises a drive device in order to drive at least one of the wheels of the dust collector arrangement, and where the floor nozzle comprises a drive device in order to drive at least one of the wheels of the floor nozzle.

17 Claims, 3 Drawing Sheets

(51) Int. Cl.
*A47L 5/36* (2006.01)
*G05D 1/02* (2020.01)
*A47L 9/02* (2006.01)
*A47L 9/04* (2006.01)

(52) U.S. Cl.
CPC .......... *B60B 19/003* (2013.01); *G05D 1/024* (2013.01); *G05D 1/0246* (2013.01); *G05D 1/0255* (2013.01); *G05D 1/0257* (2013.01); *G05D 1/0295* (2013.01); *A47L 2201/00* (2013.01); *G05D 2201/0215* (2013.01)

(56) References Cited

U.S. PATENT DOCUMENTS

| | | | |
|---|---|---|---|
| 2,482,337 A | 9/1949 | Hahn | |
| 3,876,255 A | 4/1975 | Ilon | |
| 4,519,112 A | 5/1985 | Bevington et al. | |
| 4,644,606 A | 2/1987 | Luerken et al. | |
| 5,573,369 A | 11/1996 | Du | |
| 5,815,880 A | 10/1998 | Nakanishi | |
| 6,171,054 B1 | 1/2001 | Mann, III et al. | |
| 6,519,804 B1* | 2/2003 | Vujik | A47L 5/32 15/331 |
| 6,719,830 B2 | 4/2004 | Illingworth et al. | |
| 7,113,847 B2* | 9/2006 | Chmura | A47L 5/36 318/568.1 |
| 7,323,022 B1* | 1/2008 | Redlin | A01D 43/077 15/340.1 |
| 2002/0159897 A1 | 10/2002 | Kegg et al. | |
| 2003/0202890 A1 | 10/2003 | Bundy | |
| 2004/0200505 A1 | 10/2004 | Taylor et al. | |
| 2004/0211318 A1 | 10/2004 | Morgan | |
| 2006/0191098 A1 | 8/2006 | Hiebert | |
| 2007/0272463 A1 | 11/2007 | Yu et al. | |
| 2008/0222837 A1* | 9/2008 | Kaffenberger | A47L 9/22 15/319 |
| 2009/0133720 A1* | 5/2009 | Van Den Bogert | A47L 5/362 134/18 |
| 2009/0301043 A1* | 12/2009 | Rosemeier | A47L 9/14 55/382 |
| 2009/0314318 A1* | 12/2009 | Chang | A47L 11/305 134/58 R |
| 2010/0256812 A1 | 10/2010 | Tsusaka et al. | |
| 2012/0036675 A1* | 2/2012 | Conrad | A47L 5/28 15/347 |
| 2012/0211205 A1* | 8/2012 | Eguchi | F04D 29/4226 165/121 |
| 2013/0292918 A1 | 11/2013 | Schlee et al. | |
| 2016/0095486 A1* | 4/2016 | Al Salameh | A47L 5/14 15/319 |
| 2016/0146216 A1* | 5/2016 | Chang | F04D 29/4226 417/423.14 |

FOREIGN PATENT DOCUMENTS

| | | |
|---|---|---|
| CN | 1164825 A | 11/1997 |
| CN | 1041672 C | 1/1999 |
| CN | 101384973 A | 3/2009 |
| CN | 203000795 U | 6/2013 |
| CN | 103369995 A | 10/2013 |
| DE | 298 03 415 U1 | 6/1998 |
| DE | 298 12 377 U1 | 10/1998 |
| DE | 20 2004 002284 U1 | 8/2004 |
| DE | 10 2008 019 976 A1 | 10/2009 |
| DE | 10 2008 046942 A1 | 3/2010 |
| DE | 10 2011 083 319 A1 | 3/2013 |
| DE | 20 2013 008 870 U1 | 12/2013 |
| DE | 10 2013 100 192 A1 | 7/2014 |
| EP | 1 360 922 A2 | 11/2003 |
| EP | 2 030 551 | 3/2009 |
| EP | 2 420 169 A1 | 2/2012 |
| EP | 2 420 171 A1 | 2/2012 |
| EP | 2 741 483 A2 | 6/2014 |
| EP | 2 979 742 A1 | 2/2016 |
| EP | 3 047 771 A1 | 7/2016 |
| FR | 2 847 791 A1 | 6/2004 |
| GB | 139 892 A | 3/1920 |
| GB | 419 191 A | 11/1934 |
| GB | 554 177 A | 5/1941 |
| GB | 2 344 750 A | 6/2000 |
| JP | H07 320 A | 1/1995 |
| JP | 2005 027829 A | 2/2005 |
| KR | 2005 0069018 A | 7/2005 |
| KR | 2006 0034851 A | 4/2006 |
| WO | WO 2002/058527 A1 | 8/2002 |
| WO | WO 2002/074150 A1 | 9/2002 |
| WO | WO 2007/068444 A1 | 6/2007 |
| WO | WO 2007/093926 A1 | 8/2007 |
| WO | WO 2007/117095 A1 | 10/2007 |
| WO | WO 2008/002027 A1 | 1/2008 |

OTHER PUBLICATIONS

International Search Report dated Apr. 1, 2016 for International Application No. PCT/EP2015/079464.

* cited by examiner

VACUUM CLEANER ROBOT

This application claims the benefit under 35 U.S.C. § 371 of International Application No. PCT/EP2015/079464, filed Dec. 11, 2015, which claims the benefit of European Patent Application No. 15151742.2, filed Jan. 20, 2015; which are incorporated by reference herein in their entirety.

The invention relates to a vacuum cleaner robot.

Conventional vacuum cleaners are operated by a user who moves the vacuum cleaner, and in particular the floor nozzle through which dust is suctioned, across the surface to be cleaned. Conventional floor vacuum cleaners there comprise, for example, a housing which is mounted on rollers and/or runners. A dust collection container is arranged in the housing and contains a filter bag. A floor nozzle is via a suction tube and a suction hose connected to the dust collection chamber. In conventional floor vacuum cleaners, a motorized fan unit is further arranged in the housing and creates a negative pressure in the dust collection container. In the air flow direction, the motorized fan unit is therefore arranged downstream of the floor nozzle, the suction tube, the suction hose, and the dust collection container or the filter bag, respectively. Since cleaned air passes though such motorized fan units, they are sometimes referred to as clean air motors.

Particularly in former times, there were also vacuum cleaners in which the suctioned dirty air was passed directly through the motor fan and into a dust bag directly attached downstream. Examples thereof are shown in U.S. Pat. Nos. 2,101,390, 2,036,056 and 2,482,337. These forms of vacuum cleaners are nowadays no longer very common.

Such dirty air or fouled air motor fans are also referred to as a "dirty air motor" or "direct air motor". The use of such dirty air motors is also described in documents GB 554 177, U.S. Pat. Nos. 4,644,606, 4,519,112, US 2002/0159897, U.S. Pat. No. 5,573,369, US 2003/0202890 or U.S. Pat. No. 6,171,054.

In recent years, vacuum cleaner robots have also gained popularity. Such vacuum cleaner robots no longer have to be guided by a user over the surface to be cleaned; they instead drive across the floor autonomously. Examples of such vacuum cleaner robots are known, for example, from EP 2 741 483, DE 10 2013 100 192 and US 2007/0272463.

The drawback of these known vacuum cleaner robots is that they have only low dust absorption. This is due to the fact that either the dust absorption is achieved only by the brushing effect of a rotating brush roller, or motorized fan units with very low power are used. A further drawback is that these vacuum cleaner robots have only a low dust absorption capacity due to their compact design.

An alternative vacuum cleaner robot is described in WO 02/074150. This vacuum cleaner robot is structured in two parts and comprises a container or fan module and a cleaning head module which is connected to the fan module via a hose.

Against this background, the object underlying the invention is to provide an improved vacuum cleaner robot.

This object is satisfied with the subject matter of claim 1. According to the invention, a vacuum cleaner robot is provided comprising a dust collector arrangement mounted on wheels, a suction hose and a floor nozzle mounted on wheels, where the floor nozzle is fluidically connected to the dust collector arrangement via the suction hose, also comprising a motorized fan unit for suctioning an air stream through the floor nozzle, wherein the motorized fan unit is arranged between the floor nozzle and the dust collector arrangement such that an air stream suctioned in through the floor nozzle flows through the motorized fan unit and into the dust collector arrangement, where the dust collector arrangement comprises a drive device in order to drive at least one of the wheels of the dust collector arrangement, and where the floor nozzle comprises a drive device in order to drive at least one of the wheels of the floor nozzle.

A dirty air motor or direct air motor is thereby advantageously used in a vacuum cleaner robot. Even with low engine power, a high volumetric flow can be obtained with the vacuum cleaner robot according to the invention and thereby a high cleaning effect on carpets and hard floors. A dirty air motor, for example, has a maximum rotational speed of less than 30,000 rpm and an electrical input power of less than 900 W.

In the direction of air stream, the floor nozzle, sometimes referred to as a "suction nozzle", is arranged upstream of the suction hose, and the suction hose is arranged upstream of the dust collector arrangement. The air suctioned in by way of the motorized fan unit through the floor nozzle is first passed into the suction hose and subsequently into the dust collector arrangement. Due to the fluidic connection, a continuous air stream is ensured through the floor nozzle and the suction hose into the dust collector arrangement.

It has surprisingly been found that dirty air motors can also be advantageously used in vacuum cleaner robots, in particular in order to convey dirty air suctioned in through the floor nozzle through the motorized fan unit into the dust collector arrangement.

Unlike in conventional vacuum cleaner robots with motorized fan units where negative pressure is present in particular in the dust collector arrangement or the dust collection chamber, an overpressure is present in the vacuum cleaner robot at least in the dust collector arrangement. In this way, the wall thicknesses of the dust collector arrangement can be reduced or reinforcing elements (such as, for example, reinforcing ribs) can be used to a lesser extent or even completely avoided, which leads to a reduction in weight.

Due to the structure of the vacuum cleaner robot with a dust collector arrangement and a floor nozzle connected thereto via a hose, particularly advantageous dust absorption is made possible with high flexibility. In particular, firstly, the floor nozzle can reach the surfaces to be suctioned even in tight conditions, and secondly, the dust collector arrangement can provide a relatively large dust absorption volume. The dust collector arrangement and the floor nozzle are formed as separate or individual units; they are each mounted (separately) on their own wheels. The dust collector arrangement and the floor nozzle can be moved independently of one another.

The dust collector arrangement can have three or four wheels, in particular precisely three or precisely four wheels. The drive device of the dust collector arrangement can be configured to drive one of the wheels, several or all of the wheels of the dust collector arrangement. For each drivable wheel, the drive device can have a separate or independent drive unit. This allows for independent driving of each wheel.

The floor nozzle can have three or four wheels, in particular precisely three or precisely four wheels. The drive device of the dust collector arrangement can be configured to drive one of the wheels, several or all of the wheels of the dust collector arrangement. For each drivable wheel, the drive device can have a separate or independent drive unit. This allows for independent driving of each wheel.

The drive device of the dust collector arrangement can be configured to be separate from the drive device of the floor nozzle or can be formed separately. In particular, the dust collector arrangement and the floor nozzle can be driven independently of each other. They can be moved, for example, in different directions. Also, one of the two can not be moved while the other is moved.

In the vacuum cleaner robot, the motorized fan unit can be arranged between the floor nozzle and the suction hose such that the air stream suctioned in through the floor nozzle flows through the motorized fan unit and into the suction hose. In such a design, overpressure is during operation also present in the suction hose. This means that the suction hose wall must slightly reinforced at best slightly.

In the above-described vacuum cleaner robots, the motorized fan unit can be arranged on and/or above the floor nozzle, in particular directly on and/or above the floor nozzle. This leads to advantageous suction performance. Moreover, a compact structure of the unit composed of the floor nozzle and the motorized fan unit can be obtained. For example, the motorized fan unit can be arranged such that air suctioned through the floor nozzle enters the motorized fan unit directly from the floor nozzle.

The motorized fan unit can be fluidically connected to the floor nozzle via a tube member. In this case, the motorized fan unit is no longer arranged directly on and/or above the floor nozzle. In particular, the tube member can have a length of 10 mm to 300 mm, preferably 10 mm to 100 mm.

Alternatively, the motorized fan unit can be arranged between the suction hose and the dust collector arrangement such that an air stream suctioned in through the floor nozzle flows through the suction hose and into the motorized fan unit through the motorized fan unit into the dust collector arrangement. In this way, a light and compact arrangement can be achieved on the side of the floor nozzle, which leads to high movability of the floor nozzle and accessibility of even tight areas.

In particular, the dust collector arrangement can comprise a housing and a dust separator arranged in the housing, where the motorized fan unit is arranged on, at or in the housing.

The housing can comprise a housing wall which is in particular made of plastic material.

The arrangement of the dust separator within the housing of the dust collector arrangement and the arrangement of the motorized fan unit on or in the housing allow for a compact design of the dust collector arrangement and thereby of the vacuum cleaner robot as a whole.

The motorized fan unit can (in particular during operation of the vacuum cleaner robot) be arranged on top of or above the dust separator or at the same height as the dust separator. The motorized fan unit is therefore, in particular, not arranged below the dust separator. Conveying the dirty air through the motorized fan unit thereby does not have to occur against gravity, or only to a small extent.

The motorized fan unit can be arranged on the housing. In particular, the dust separator can there during operation of the vacuum cleaner robot be arranged below the motorized fan unit or at the same height.

In the above-described vacuum cleaner robots, one of the wheels, several or all wheels of the dust collector arrangement and/or one of the wheels, several or all the wheels of the floor nozzle can be omnidirectional wheels. The use of omnidirectional wheels allows for very flexible and versatile movement of the dust collector arrangement or the floor nozzle, respectively.

Each omnidirectional wheel on its circumference comprises a plurality of rotatably mounted rollers or roller bodies, the axes of which are not in parallel to the wheel axis (of the omnidirectional wheel). The axes of the rollers can in particular run or be oriented at an angle or transverse with respect to the wheel axis. An example of an omnidirectional wheel is a Mecanum wheel, which is described, inter alia, in U.S. Pat. No. 3,876,255.

The motorized fan unit can be configured in such a way that with aperture 8 it has a volumetric flow of more than 30 lts, in particular of more than 35 lfs, at an electrical input power of less than 450 W according to DIN EN 60312-1. The motorized fan unit can alternatively or additionally be configured in such a way that with aperture 8 it has a volumetric flow of more than 25 lts, in particular of more than 30 lts, at an electrical input power of less than 250 W according to DIN EN 60312-1. The motorized fan unit can alternatively or additionally be configured in such a way that with aperture 8 it has a volumetric flow of more than 10 l/s, in particular of more than 15 lts, at an electrical input power of less than 100 W according to DIN EN 60312-1.

In this way, a particularly efficient vacuum cleaner robot is obtained, which in particular has a greatly increased suction force as compared to conventional vacuum cleaner robots.

The air data of a vacuum cleaner or a motorized fan unit is determined according to DIN EN 60312-1: 2014-01. In particular section 5.8 is made reference to. Measuring device B according to section 7.3.7.3 is there used. If a motorized fan unit without a vacuum cleaner housing is measured, then measuring device B is likewise used. For possibly necessary adapters for connecting to the measuring chamber, the descriptions in section 7.3.7.1 apply.

The terms "volumetric flow" and "suction air flow" are also used for the term "air stream" according to DIN EN 60312-1.

The floor nozzle can have a floor plate with a base surface which during operation of the vacuum cleaner robot faces the surface to be suctioned, where the floor plate has at least one air flow channel parallel to the base surface with an opening provided laterally in the floor plate. In particular, the floor plate with its base surface can during operation of the vacuum cleaner robot rest on the surface to be suctioned or, for example, be spaced thereform by way of a bristle strip. The floor plate can comprise at least one curved air flow channel parallel to the base surface. The curved air flow channel can have the shape of a circular ring or a circular ring portion.

The floor plate is also referred to as a nozzle sole. The floor nozzle comprises a suction opening for producing a fluidic connection with the motorized fan unit. This suction opening is in fluidic connection with the at least one air flow channel. With the at least one, in particular, one or more air flow channels, the contact pressure of the floor nozzle is advantageously adjusted for good suction power.

The suction hose can typically have a diameter in a range of 25 mm to 50 mm and/or a length in a range of 500 mm to 2500 mm. The suction hose can be configured to be flexible, in particular such that it can be deformed by a user when the vacuum cleaner robot is used as intended. The suction hose can be partially or completely made of plastic material. It can in particular comprise a plastic wall and/or reinforcement made of metal (for example a spiral wire). The suction hose can be designed as a stretch hose. It therefore has a variable length and can be extended to a multiple of its unstretched (stationary) length.

The suction hose can have a constant or a variable diameter over its length. The suction hose can in particular have a tapering shape, where the diameter preferably reduces towards the floor nozzle. The above-mentioned diameters refer in particular to the smallest diameter of the suction hose.

The dust collector arrangement can be configured and/or the motorized fan unit can be arranged such that no contact between the fan wheel of the motorized fan unit and a test probe according to IEC/EN 60335 is possible through the floor nozzle. Reference is there made to section 8 of the version DIN EN 60335-1: 2012-10. In particular, test probe B is to be used.

This reduces the risk of damaging the motorized fan unit and the risk of injury when touching the floor nozzle while the motor is running.

The vacuum cleaner robot can be a bag-type vacuum cleaner. A bag-type vacuum cleaner is a vacuum cleaner in which the suctioned dust is separated and collected in a vacuum cleaner filter bag. The filter area of the vacuum cleaner filter bag can be at least 800 cm$^2$. The vacuum cleaner robot can in particular be a bag-type vacuum cleaner for disposable bags.

The filter area of a vacuum cleaner filter bag designates the entire area of the filter material which is located between or within the edge seams (for example welding or adhesive seams). Any side or surface folds that may be present also need to be considered. The area of the bag filling opening or inlet opening (including a seam surrounding this opening) is not part of the filter area.

The vacuum cleaner filter bag can be a flat bag or have a block bottom shape. A flat bag is formed by two side walls made of filter material which are joined together (for example welded or glued) along their peripheral edges. The bag filling opening or inlet opening can be provided in one of the two side walls. The side faces or walls can each have a rectangular basic shape. Each side wall can comprise one or more layers of nonwoven and/or nonwoven fabric.

The vacuum cleaner robot in the form of a bag-type vacuum cleaner can comprise a vacuum cleaner filter bag, where the vacuum cleaner filter bag is designed in the form of a flat bag and/or a disposable bag.

The bag wall of the vacuum cleaner filter bag can comprise one or more layers of a nonwoven and/or one or more layers of nonwoven fabric. It can in particular comprise a laminate of one or more layers of nonwoven and/or one or more layers of nonwoven fabric. Such a laminate is described, for example, in WO 2007/068444.

The term nonwoven fabric is used within the meaning of standard DIN EN ISO 9092:2010. In particular, film and paper structures, in particular filter paper, are there not regarded as being nonwoven fabric. "Nonwoven" is a structure made of fibers and/or continuous filaments or short fiber yarns shaped into a surface structure by some method (except interlacing of yarns such as woven fabric, knitwear, lace, or tufted fabric) but not bonded by some method. With a bonding process, a nonwoven turns into nonwoven fabric. The nonwoven or nonwoven fabric can be dry laid, wet laid or extruded.

The vacuum cleaner robot can comprise a blow-out filter, in particular having a filter area of at least 800 cm$^2$. The blow-out filter can in particular be configured to be pleated or folded. This makes it possible to obtain a large surface area at a smaller base area. The blow-out filter can be provided in a holder, as described, for example, in European patent application No. 14179375.2. Such blow-out filters allow the use of vacuum cleaner filter bags with low separation efficiency, for example, of single-layer vacuum cleaner filter bags. For example, a bag can be used as a vacuum cleaner filter bag with low separation efficiency in which the filter material of the bag wall consists of a spunbond with a surface weight of 15 g/m$^2$ to 100 g/m$^2$. The vacuum cleaner filter bag can therefore be formed in particular having a single layer. For example, a bag can alternatively be used in which the filter material of the bag wall consists of a laminate made of a spunbond, a meltblown and a further spunbond (SMS).

Alternatively, the vacuum cleaner robot can be a bagless vacuum cleaner, in particular with a blow-out filter as described above having a filter area of at least 800 cm$^2$. A bagless vacuum cleaner is a vacuum cleaner in which the suctioned dust is separated and collected without a vacuum cleaner filter bag. In this case, the dust collector arrangement can comprise an impact separator or a centrifugal separator or a cyclone separator, respectively.

The motorized fan unit can have an in particular single stage radial fan. In a radial fan, the air is suctioned parallel or axially relative to the drive axis of the fan wheel and deflected by the rotation of the fan wheel, in particular by approximately 90°, and blown out radially.

In principle, the floor nozzle can be an active or a passive floor nozzle. An active floor nozzle has a brush roller (sometimes also referred to as a beating and/or rotation brush) in the suction opening. The brush roller can be driven electro-motorically A passive floor nozzle has no brush roller.

In the vacuum cleaner robots described, very good efficiency and suction performance can on account of the overall design also be obtained with a passive floor nozzle, i.e. without a brush roller. When using passive floor nozzles, the structure is simplified and the weight of the floor nozzle is thereby reduced, whereby the drive device of the floor nozzle has a lower power demand.

The vacuum cleaner robots described are designed for driving across a surface to be cleaned in an independent or autonomous manner.

The vacuum cleaner robots described can comprise a control and navigation device for autonomously driving the floor nozzle and/or the dust collector arrangement. This allows for autonomous vacuum cleaning by the vacuum cleaner robot. The control and navigation device can be designed in particular for controlling the drive device of the dust collector arrangement, the drive device of the floor nozzle and/or the motorized fan unit. The control and navigation device can be arranged on or in the dust collector arrangement and/or on or in the floor nozzle. The control and navigation device can in particular be arranged exclusively on or in the dust collector arrangement. In this case, controlling and navigating the floor nozzle can also be carried out on the part of the dust collector arrangement.

The vacuum cleaner robots described can have a device for transmitting control signals from the control and navigation device to the floor nozzle. The device for [transmitting SIC] control signals can be configured to form a wired or a wireless transmission.

The vacuum cleaner robots described can comprise one or more devices for determining the location. The devices for determining the location can be, in particular, cameras, displacement sensors and/or distance sensors. The distance sensors can be based, for example, on sound waves or electromagnetic waves. The devices for determining the location can be arranged on or in the dust collector arrangement and/or on or in the floor nozzle.

The vacuum cleaner robots described can have a wireless power supply. They can in particular have a rechargeable battery for power supply.

The dust collector arrangement can have a lifting device for adjusting the height of the underside of the dust collector arrangement above the floor, in particular the underside of the housing of the dust collector arrangement. The distance between the underside of the dust collector arrangement and the floor clearance of the dust collector arrangement can be adjusted thereby. For example in a charging position of the vacuum cleaner robot. This allows increasing the height of the underside above the floor in order to drive the floor nozzle under the dust collector arrangement or its housing.

Further features are described with reference to the figures, where

Figure 1:
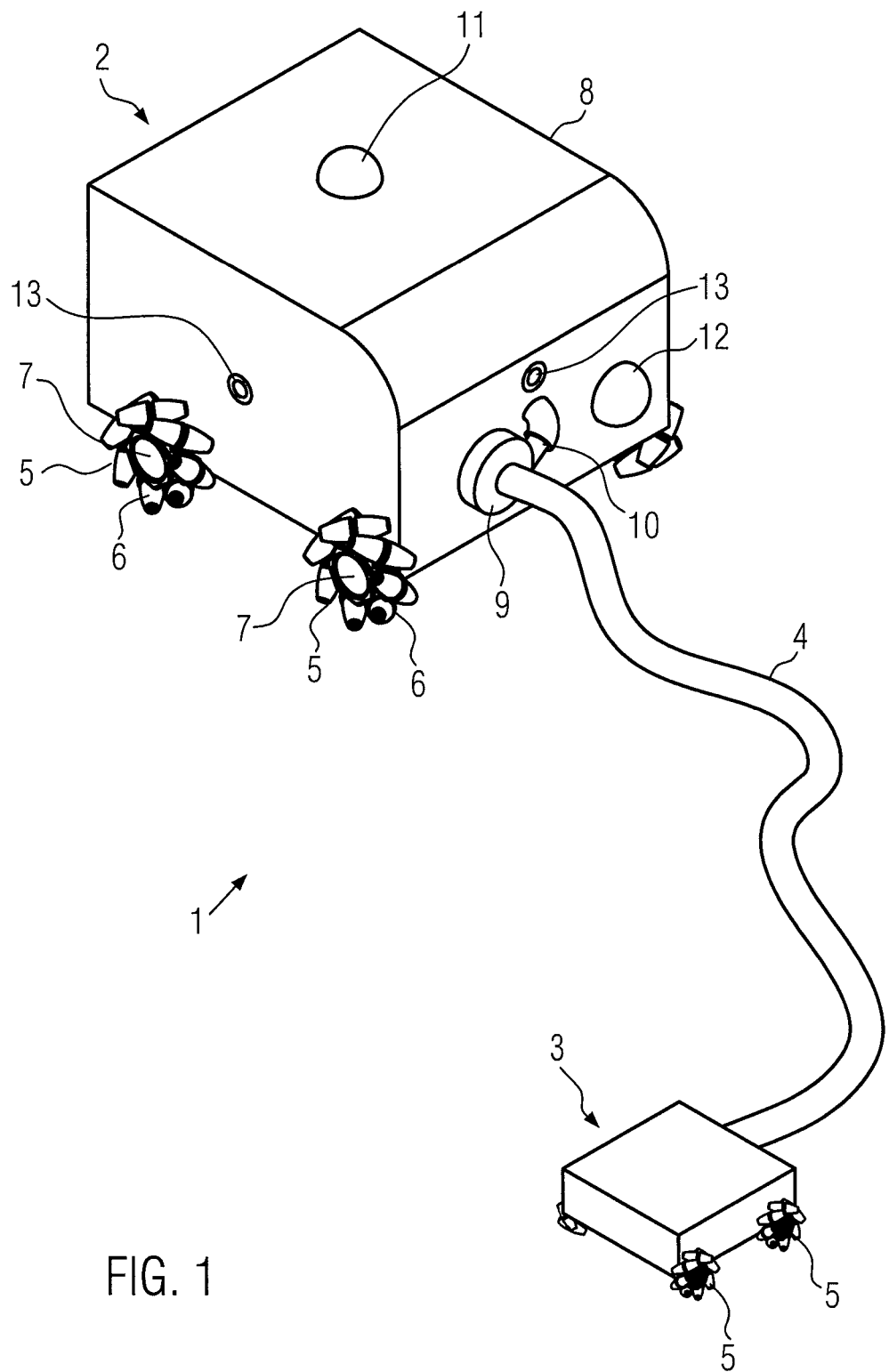
FIG. 1 shows a first embodiment of a vacuum cleaner robot.

FIG. 1 is a schematic representation of a first embodiment of a vacuum cleaner robot 1. Vacuum cleaner robot 1 shown comprises a dust collector arrangement 2 and a floor nozzle 3 which is connected to dust collector arrangement 2 via a flexible suction hose 4.

Dust collector arrangement 2 is mounted on four wheels 5, each of which is formed as an omnidirectional wheel. Each omnidirectional wheel 5 has a plurality of rotatably mounted rollers 6 on its circumference. The rotational axes of rollers 6 are all not parallel to the wheel axis 7 of the respective omnidirectional wheel. For example, the rotational axes of the rollers can assume an angle of 45° relative to the respective wheel axis. The surfaces of the rollers or roller bodies are curved or bent.

Examples of such omnidirectional wheels are described in U.S. Pat. No. 3,876,255, US 2013/0292918, DE 10 2008 019 976 or DE 20 2013 008 870.

Dust collector arrangement 2 comprises a drive device for driving wheels 5 of the dust collector arrangement. The drive device can comprise a separate drive unit, for example, in the form of an electric motor, for each wheel 5 so that each wheel 5 can be driven independently of the other wheels. Rollers 6 are rotatably mounted without a drive.

By suitably driving individual or all wheels 5, dust collector arrangement 2 can be moved in any direction. If, for example, all four wheels 5 are moved at the same speed in the same direction of rotation, then the dust collector arrangement moves straight ahead. With a counter-rotating movement of the wheels on one side, a lateral movement or displacement can be achieved.

In principle, not all wheels need to be drivable; Individual wheels can also be provided without their own drive. In addition, it is also possible that individual wheels are not driven for certain movements, even if they are basically drivable.

In alternative embodiments, fewer or more than four wheels can also be formed in the form of omnidirectional wheels. An example with three omnidirectional wheels is described in US 2007/0272463.

In the example shown, floor nozzle 3 is also equipped with four omnidirectional wheels 5. These wheels are in the embodiment smaller than the wheels of dust collector arrangement 2. In analogous form, floor nozzle 3 also comprises a drive device for wheels 5. Here as well, the drive device for each wheel comprises a single drive unit, for example, in the form of electric motors, in order to drive each wheel separately and independently of the other wheels. In this way, the floor nozzle can also be moved in any direction by suitably driving the wheels.

Floor nozzle 3 comprises a floor plate with a base surface which, during operation of the vacuum cleaner robot faces the floor, i.e. the surface to be suctioned. In the floor plate, one or more air flow channels are incorporated parallel to the base surface, through which the dirty air is suctioned in. The air flow channel(s) can comprise an opening provided laterally in the floor plate. The air flow channel can be straight or curved, in particular have the shape of a circular ring or a circular ring section. The shape of a circular ring section or of a circular ring can be advantageous in particular for lateral movements of the floor nozzle.

In the examples shown, dust collector arrangement 2 comprises a housing 8 on which a motorized fan unit 9 is arranged. A tube member 10 leads from motorized fan unit 9 to a vacuum cleaner filter bag which forms a dust separator. The vacuum cleaner filter bag can be removably attached in the interior of housing 8 in a conventional manner, for example, by way of a holding plate.

In the arrangement shown, a continuous fluidic connection to the dust separator is therefore established by floor nozzle 3, suction hose 4, motorized fan unit 9 and tube member 10. Motorized fan unit 9 is there arranged between suction hose 4 and the dust separator so that dirty air suctioned in through the floor nozzle flows through motorized fan unit 9 (in particular via tube member 10) into the vacuum cleaner filter bag arranged in the interior of housing 8.

Motorized fan unit 9 is therefore a dirty air motor. This is in particular a motorized fan unit comprising a radial fan.

The motorized fan unit has a volumetric flow of more than 30 l/s (determined according to DIN EN 60312-1: 2014-01, with an aperture of 8) at an electrical input power of less than 450 W, a volumetric flow rate of more than 25 l/s at an electrical input power of less than 250, and a volumetric flow of more than 10 l/s at an electrical input power of less than 100 W.

The fan diameter can be 60 mm to 160 mm. A motorized fan unit, for example, from the company AMETEK, Inc. can be used, which is also used in Soniclean Upright vacuum cleaners (e.g. SONICLEAN VT PLUS).

The motorized fan unit of the SONICLEAN VT PLUS was characterized according to DIN EN 60312-1: 2014-01 as explained above. The motorized fan unit was measured without the vacuum cleaner housing. For possibly necessary adapters for connection to the measuring chamber, the descriptions in section 7.3.7.1 apply. The table shows that high volumetric flows are obtained at low rotational speeds and low input power.

| AMETEK "dirty air" (fan wheel diameter 82 mm) with aperture 8 (40 mm) | | | | |
| --- | --- | --- | --- | --- |
| Input power [W] | voltage [V] | rotational speed [RPM] | negative pressure box [kPa] | volumetric flow [l/s] |
| 200 | 77 | 15,700 | 0.98 | 30.2 |
| 250 | 87 | 17,200 | 1.17 | 32.9 |
| 300 | 95 | 18,400 | 1.34 | 35.2 |
| 350 | 103 | 19,500 | 1.52 | 37.5 |
| 400 | 111 | 20,600 | 1.68 | 39.4 |
| 450 | 117 | 21,400 | 1.82 | 41.0 |

Air is during operation sucked in by motorized fan unit 9. The air stream there enters vacuum cleaner robot 1 through an opening of floor nozzle 3 and flows through suction hose 4 into motorized fan unit 9. Due to the arrangement of motorized fan unit 9—in the air stream direction—upstream of the dust separator (in the form of a vacuum cleaner filter bag), there is an overpressure in housing 8 as well as in the dust separator.

In conventional vacuum cleaners, the motorized fan unit is installed in the dust collector arrangement in the air stream direction downstream of the dust separator, for example, the vacuum cleaner filter bag, which results in particular in that the housing of the dust collector arrangement is subjected to negative pressure. In order to avoid deformation of the housing due to the negative pressure, the latter must typically be reinforced, for example, using respective reinforcement ribs. In the configuration illustrated in FIG. 1, this is not required or only to a small degree because of the overpressure in housing 8.

Vacuum cleaner robot 1 comprises a control and navigation device for autonomously driving dust collector arrangement 2 and floor nozzle 3. For this purpose, a correspondingly programmed microcontroller is arranged in housing 8 of dust collector arrangement 2. The control and navigation device is connected to devices for determining the location. They include cameras 11 and 12 as well as distance sensors 13. The distance sensors can be, for example, laser sensors.

Navigation of the vacuum cleaner robot occurs in a known manner, as described, for example, in WO 02/074150. The control and navigation device arranged in housing 8 controls both the drive unit of dust collector arrangement 2 as well as the drive unit of floor nozzle 3.

A device is provided for the latter for transmitting control signals from the control and navigation device in housing 8 of dust collector arrangement 2 to floor nozzle 3, in particular to the drive device of the floor nozzle. For this purpose, wireless transmitters/receivers can be arranged on the part of dust collector arrangement 2 and floor nozzle 3. Alternatively, a wired connection for transmitting control signals can also be provided along the suction hose.

Floor nozzle 3 can in a supporting manner also comprise one or more devices for determining the location. For example, path sensors and/or distance sensors can be provided on the floor nozzle. In order to use the corresponding information for control and navigation, respective signals are transmitted from the floor nozzle to the control and navigation device.

The power supply for the vacuum cleaner robot can be effected in a wireless manner. Power supply for the floor nozzle, in particular its drive device, is effected by way of a power supply cable in or along suction hose 4.

Dust collector arrangement 2 can alternatively or additionally comprise rechargeable batteries which can be charged, for example, in a cabled or wireless (inductive) manner. For charging the batteries, vacuum cleaner 1 can move, for example, autonomously to a charging station. If the power supply to the drive device of the floor nozzle is not exclusively effected by a power connection via suction hose 4, then floor nozzle 3 itself can also comprise rechargeable batteries.

Figure 2:
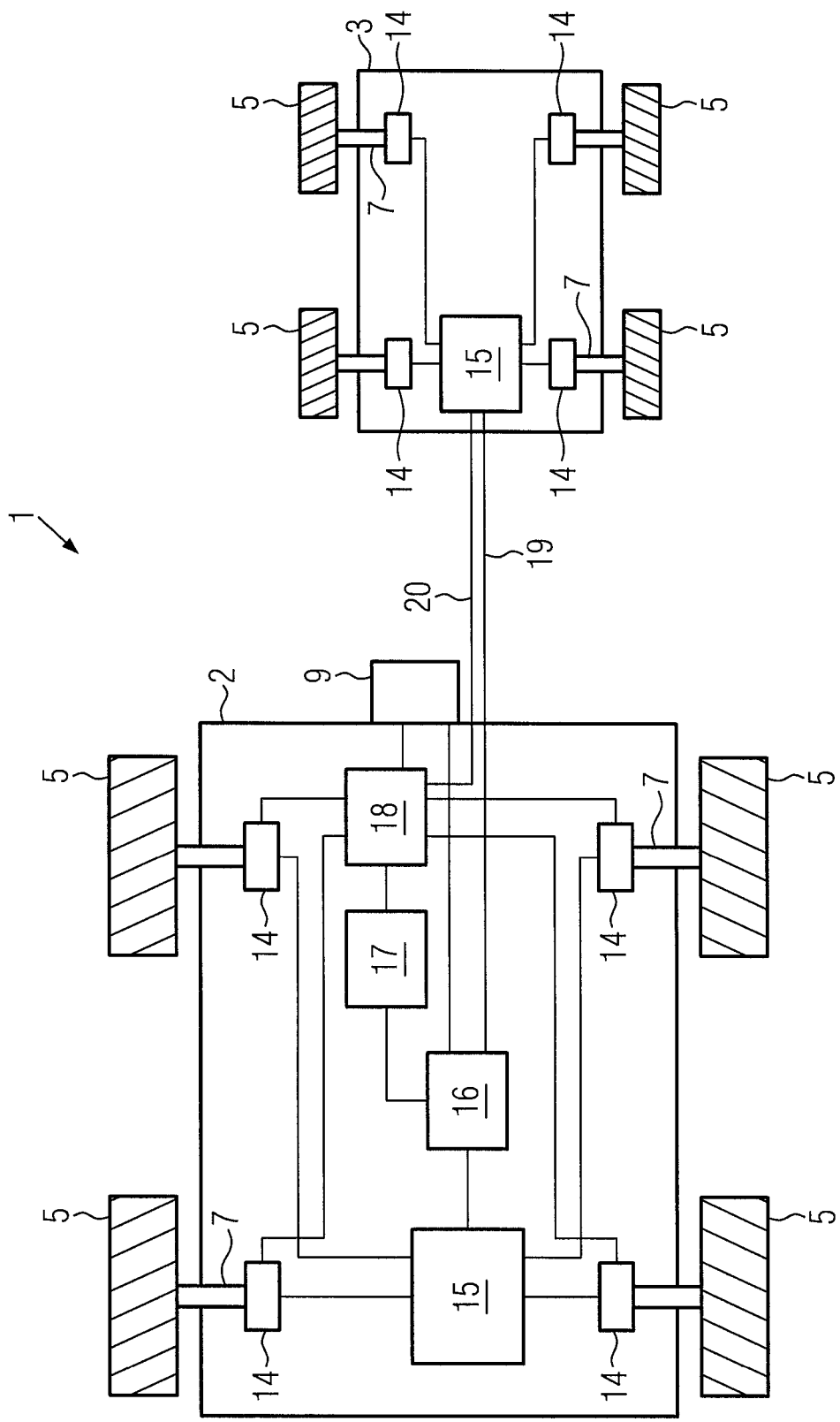
FIG. 2 shows a block circuit diagram of a vacuum cleaner robot.

FIG. 2 is a schematic block circuit diagram of a vacuum cleaner robot 1 with a dust collector arrangement 2 and a floor nozzle 3. The drive device for wheels 5 of dust collector arrangement 2 comprises, firstly, four drive units 14 in the form of electric motors and, secondly, a microcontroller 15 for controlling the electric motors.

A control and navigation device 16 is also provided in dust collector arrangement 2 and serves to control the autonomous driving of the dust collector arrangement and the floor nozzle Control and navigation device 16 is connected both to microcontroller 15 of the drive device as well as to a further microcontroller 17 which is part of the devices for determining the location. Data signals from different sensors and/or cameras are processed in microcontroller 17 and made available to control and navigation device 16.

Control and navigation device 16 is also connected to motorized fan unit 9 in order to drive it In the example illustrated, power supply or voltage supply is effected by way of a rechargeable battery 18, which can be charged wirelessly or in a cabled manner. Charging can be effected at a charging station which is autonomously approached by the robot. At the charging station, the dust collection chamber can also be automatically cleaned (for example, suctioned out) in order to increase the capacity of the device, i.e. to improve the range. In addition, the blow-out filter can also be cleaned at the charging station. This can also lead to an increased service life. In order to minimize the space requirement of the robot at the charging station, the floor nozzle can be positioned beneath the dust collector arrangement during the charging or cleaning operation. For this purpose, the dust collector arrangement is by use of a lifting device automatically raised and ground clearance is thereby increased so that the floor nozzle can drive therebeneath.

For the sake of clarity, not all power supply connections are shown in the figure.

The floor nozzle also comprises a drive device for its four wheels 5, where the drive device, like in the case of dust collector arrangement 2, comprises a microcontroller 15 and four electric motors 14. The control signals for the drive device of floor nozzle 3 originate from the control and navigation device 16 which is arranged in dust collector arrangement 2. The signals are transmitted via a communication line 19 which can be arranged, for example, in the wall of the suction hose. Alternatively, however, this signal transmission could also be effected wirelessly.

Power and voltage supply is effected via rechargeable battery 18 of dust collector arrangement 2. For this purpose, a line 20 is provided which is arranged in the wall of the suction hose.

The example shown in FIG. 1 is a bag-type vacuum cleaner. This means that, arranged in dust collector arrangement 2 is a vacuum cleaner filter bag 11 in which the suctioned dirt and dust is separated. This vacuum cleaner filter bag can be, in particular, a flat bag, the bag walls of which comprise one or more layers of nonwoven and/or nonwoven fabric. The vacuum cleaner filter bag is embodied as a disposable bag.

When using in particular single-layer vacuum cleaner filter bags in which the bag wall is composed, for example, of exactly one nonwoven fabric layer in the form of a spunbond, the use of a blow-out filter is advantageous. The dust filter can be used to filter fine dust which has not been separated in the vacuum cleaner filter bag. Such a blow-out filter can have an area of at least 800 $cm^2$. It can in particular be formed to be pleated or folded in order to have a large surface area at a smaller base area (than the surface area).

Suction hose 4 typically has a diameter in a range of 25 mm to 50 mm and a length in a range of 500 mm to 2500 mm.

As an alternative to what is described above, the vacuum cleaner robot can also be a bagless vacuum cleaner in which dust collector arrangement 2 comprises a centrifugal separator or cyclone separator, respectively, in which the dirt and dust particles suctioned in are separated by centrifugal force. Alternatively, the bagless vacuum cleaner can also be designed as an impact separator.

In particular in the case of bagless vacuum cleaners, the dust collector arrangement comprises a blow-out filter with which fine dust is filtered that has not been separated in the centrifugal separator. This blow-out filter can have an area of at least 800 cm². It can in particular be formed to be pleated or folded in order to have a large surface area at a smaller base area. The blow-out filter can there be provided in a holder, as described in European patent application No. 14179375.2.

Figure 3:
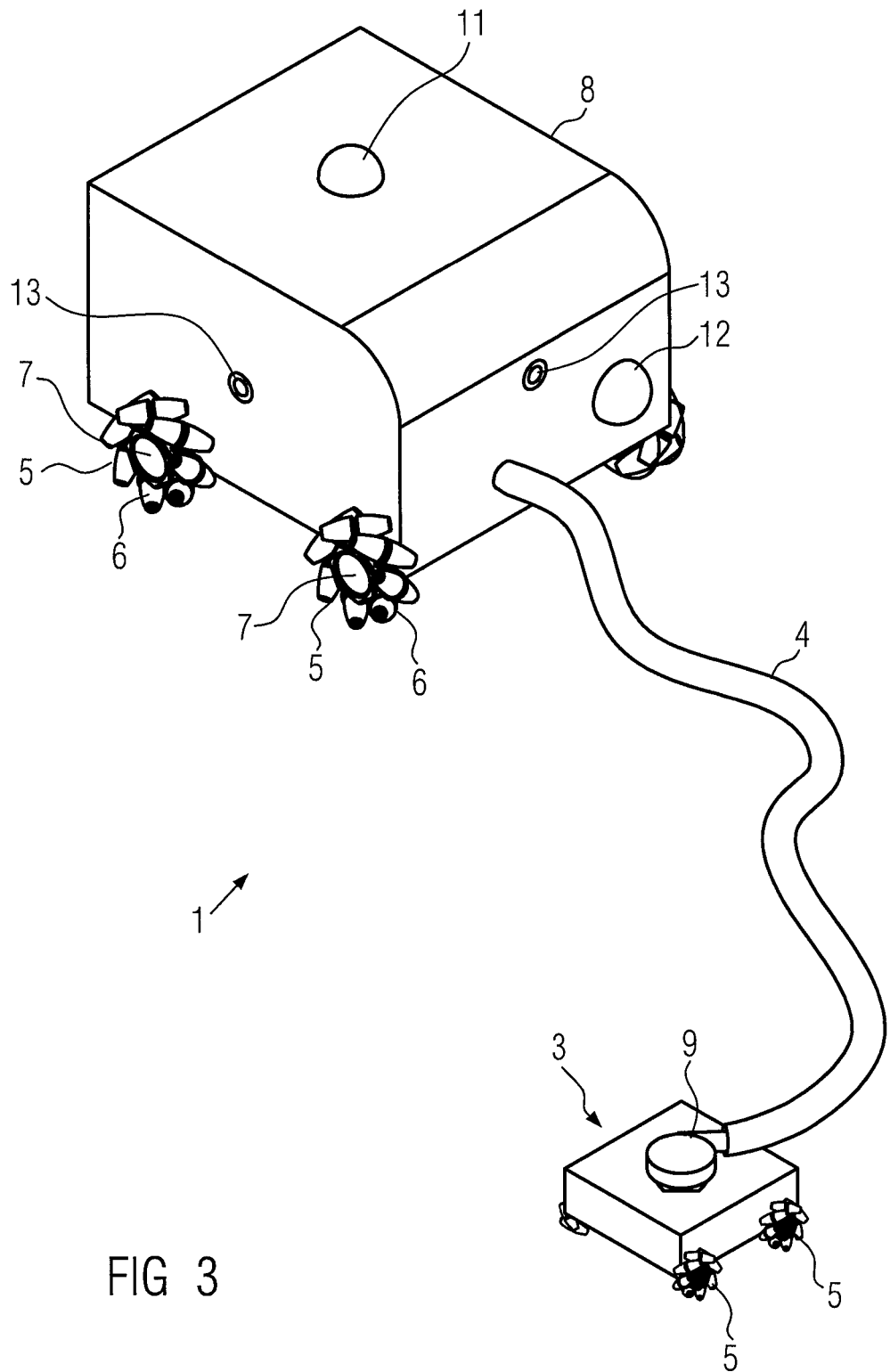
FIG. 3 shows a second embodiment of a vacuum cleaner robot.

FIG. 3 schematically illustrates an alternative embodiment in which same reference symbols are used as in FIG. 1 for identical elements. In the example shown in FIG. 3, motorized fan unit 3 is arranged directly on floor nozzle 9.

Motorized fan unit 9 is again a dirty air motor with a radial fan. The motorized fan unit has a fan wheel the axis of which is during intended use parallel to the surface to be suctioned and perpendicular to the intended sliding direction of the floor nozzle.

Air is during operation sucked in by motorized fan unit 9. The air stream there enters vacuum cleaner robot 1 through an opening of floor nozzle 3 and passes through motorized fan unit 9 and then flows into suction hose 9. Due to the arrangement of motorized fan unit 9 on floor nozzle 3 and—in the direction of air flow—upstream of suction hose 4, an overpressure prevails in suction hose 4 and in dust collector arrangement 2.

The features described in the context of FIG. 1 further apply also to the example of FIG. 3.

It is in the embodiments described not necessary that a brush roller (for example a beating brush and/or a rotating brush) be provided on or in floor nozzle 3.

The invention claimed is:

1. A vacuum cleaner robot comprising a dust collector arrangement mounted on wheels, a suction hose, a floor nozzle mounted on wheels, wherein said floor nozzle is fluidically connected to said dust collector arrangement via said suction hose, and
   a single motorized fan unit for suctioning an air stream in through said floor nozzle, wherein said motorized fan unit is arranged between said floor nozzle and said dust collector arrangement such that an air stream suctioned in through said floor nozzle flows through said motorized fan unit and into said dust collector arrangement,
   wherein said dust collector arrangement comprises a drive device to drive at least one of said wheels of said dust collector arrangement,
   wherein said floor nozzle comprises a drive device in order to drive at least one of said wheels of said floor nozzle, and
   wherein said motorized fan unit is arranged between said floor nozzle and said suction hose such that the air stream in through said floor nozzle flows through said motorized fan unit and into said such hose.

2. The vacuum cleaner robot according to claim 1, wherein said motorized fan unit is arranged on and/or above said floor nozzle.

3. The vacuum cleaner robot according to claim 1, wherein one, several or all wheels of said dust collector arrangement or one, several or all wheels of said floor nozzle are omnidirectional wheels.

4. The vacuum cleaner robot according to claim 1, wherein said motorized fan unit is configured such that with a 40 mm aperture according to DIN EN 60312-1: 2014-01 the motorized fan unit has a volumetric flow of more than 30 l/s at an electrical input power of less than 450 W according to DIN EN 60312-1: 2014-01, with the 40 mm aperture the motorized fan unit has a volumetric flow of more than 25 l/s at an electrical input power of less than 250 W according to DIN EN 60312-1: 2014-01, or with the 40 mm aperture the motorized fan unit has a volumetric flow of more than 10 l/s at an electrical input power of less than 100 W according to DIN EN 60312-1: 2014-01.

5. The vacuum cleaner robot according to claim 1, wherein said suction hose has a diameter in a range from 25 mm to 50 mm or a length in a range from 500 mm to 2500 mm.

6. The vacuum cleaner robot according to claim 1, comprising a blow-out filter.

7. The vacuum cleaner robot according to claim 6, wherein the blow-out filter comprises a filter area of at least 800 cm².

8. The vacuum cleaner robot according to claim 1, wherein said vacuum cleaner robot is a bag-type vacuum cleaner.

9. The vacuum cleaner robot according to claim 8, comprising a vacuum cleaner filter bag, wherein said vacuum cleaner filter bag is a flat bag or a disposable bag and/or
   wherein a bag wall of said vacuum cleaner filter bag comprises one or more layers of a nonwoven or one or more layers of nonwoven fabric.

10. The vacuum cleaner robot according to claim 8, wherein the bag-type vacuum cleaner comprises a filter area of at least 800 cm².

11. The vacuum cleaner robot according to claim 1, wherein said vacuum cleaner robot is a bagless vacuum cleaner.

12. The vacuum cleaner robot according to claim 11, wherein said dust collector arrangement comprises an impact separator or a centrifugal separator.

13. The vacuum cleaner robot according to claim 11, therein the bagless vacuum cleaner comprises a blow-out filter having a filter area of at least 800 cm².

14. The vacuum cleaner robot according to claim 1, wherein said motorized fan unit comprises a radial fan.

15. The vacuum cleaner robot according to claim 1, wherein said floor nozzle comprises no rotating brush.

16. The vacuum cleaner robot according to claim 1, comprising a control and navigation device for autonomously driving said floor nozzle or said dust collector arrangement.

17. The vacuum cleaner robot according to claim 1, comprising one or several devices for determining a location of at least one of the dust collector arrangement or the floor nozzle.

* * * * *